United States Patent Office 2,833,760
Patented May 6, 1958

2,833,760

2,5-BIS-(METHYL - ETHYLENIMINO) - HYDROQUINONES AND PROCESS FOR PREPARATION

Adrian Marxer, Basel, Switzerland, assignor to Ciba Pharmaceutical Products Inc., Summit, N. J.

No Drawing. Application January 23, 1956
Serial No. 560,880

Claims priority, application Switzerland January 28, 1955

5 Claims. (Cl. 260—239)

This invention relates to the new compound 2,5-bis-(methyl-ethylenimino)-hydroquinone of the formula

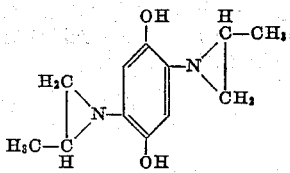

its metal salts, and pharmaceutical preparations thereof.

The new compound is highly effective against Trichomonas and amoebae, for example, against *Entamoeba histolytica*.

It is known that aminoquinones are obtained by the reaction of quinones with amines. Aminohydroquinones have not yet been obtained in this manner (compare, for example, Martynoff and Tstatsas, Bulletin de la Société Chimique de France, vol. 14, page 52 (1947), Cavallito, Soria and Hoppe, J. Am. Chem. Soc., vol. 72, page 2661 (1950)).

The present invention is based on the observation that in the reaction of quinone with C-methyl-ethylenimine bis - (methyl - ethylenimino) - hydroquinone is obtained when certain reaction conditions are employed. Accordingly, the process of the invention is characterized in that para-quinone is reacted with C-methyl-ethylenimine, and the resulting 2,5-bis-(methyl-ethylenimino)-hydroquinone is isolated and/or any 2,5-bis-(methyl-ethylenimino)-para-quinone formed is treated with a reducing agent. More especially the reaction is conducted in a solvent, such as dioxane, ethyl alcohol, isopropyl alcohol or butyl alcohol, isopropyl ether or the like, and with a larger quantity of the C-methyl-ethylenimine than corresponds to the molecular ratio para-quinone:C-methyl-ethylenimine of 3:2, particularly in the molecular ratio 1:2 and especially from 1:2.5 to 1:4. The reaction is advantageously carried out in the absence of atmospheric oxygen, for example, in an atmosphere of nitrogen or hydrogen and at a raised temperature, for example 40–100° C. The isolation of the product is carried out in known manner. Advantageously the quinone derivative formed in addition to the hydroquinone compound is extracted by means of a solvent.

According to the process of the invention a resulting mixture of 2,5-bis-(methyl-ethylenimino)-hydroquinone and 2,5-bis-(methyl-ethylenimino)-para-quinone can be treated directly with a reducing agent or the 2,5-bis-(methyl-ethylenimino)-para-quinone can be separated and subsequently reduced. In these latter cases, the reduction can be carried out more especially with sodium dithionite in an alkaline medium or with hydrogen in the presence of a nickel catalyst. In order to remove the catalyst the hydroquinone derivative so formed is dissolved in a slight excess of cold alkali hydroxide, such a sodium hydroxide, advantageously in an atmosphere of nitrogen, the catalyst is removed, and the 2,5-bis-(methyl-ethylenimino)-hydroquinone is precipitated from the solution with the calculated quantity of cold acid, such as acetic acid. The reduction may also be carried out with other agents suitable for the transformation of quinones to hydroquinones, for example with a dimetal hydride such as lithium-aluminum hydride or sodium boron hydride, for example, in the presence of a solvent such as ether or dioxane.

The resulting 2,5-bis-(methyl-ethylenimino)-hydroquinone may be converted into salts of metals. Thus it may be dissolved in an alkali hydroxide.

The present invention also comprises any modification of the process in which a compound obtainable as an intermediate product in the process, especially 2,5-bis-methyl-ethylenimino)-para-quinone, is used as starting material and the remaining step or steps, for example, the treatment with the reducing agent, are carried out.

The 2,5 - (bis - methyl - ethylenimino) - hydroquinone or salts thereof, obtained according to the present invention can be used as medicaments in the treatment of diseases induced by amoebae or Trichomonas in the form of pharmaceutical preparations which contain the active compound in therapeutically effective amount in intimate admixture with a solid diluent or in a solution suitable for enteral, especially oral, or topical or parenteral administration. The manufacture of the pharmaceutical preparations is carried out according to known methods, for example, by adding the therapeutically active compound to an excipient or a mixture of excipients. As excipients there are used substances which do not react with the new compounds, for example, water, gelatine, lactose, starches, magnesium stearate, talc, vegetable oils, benzyl alcohols, gums, polyalkylene glycols, petroleum jelly, cholesterol or other known carriers for medicaments. The pharmaceutical preparations may be made up, for example, in the form of tablets, dragees, salves, creams or in liquid form as solutions, suspensions or emulsions. If desired, they may be sterilized and/or may contain auxiliary substances, such as preserving agents, salts for regulating the osmotic pressure or buffers. They may also contain other therapeutically valuable substances, for example, anti-bacterials.

The following examples illustrate the invention:

*Example 1*

43.2 grams of para-benzoquinone are dissolved in 350 cc. of dioxane. To the solution there are added dropwise in the course of 15 minutes 57.0 grams of C-methyl-ethylenimine in 75 cc. of dioxane, the internal temperature being maintained at 40–45° C. The whole is then stirred for a further 5 hours at 70° C. The resulting white precipitate is isolated by filtering with suction and washed with dioxane and alcohol. The micro-crystalline lamellae so obtained consist of analytically pure 2,5-bis-(methyl-ethylenimino)-hydroquinone, which decomposes at 196° C. without melting.

*Example 2*

2.2 grams of 2,5-bis-(methyl-ethylenimino)-para-quinone (obtained by reacting 3 mols of para-quinone with 2 mols of C-methyl-ethylenimine in alcohol at 10–20° C.) are suspended in 100 cc. of absolute alcohol and agitated with hydrogen in the presence of 2 grams of Raney nickel. After a short time, 220 cc. of hydrogen are combined. The precipitated 2,5-bis-(methyl-ethylenimino)-hydroquinone is separated together with the nickel catalyst and agitated with 40 cc. of cold 1n-caustic soda solution in a hydrogen atmosphere with good external cooling, filtered to remove the nickel, and then immediately mixed with 20 cc. of cold 2n-acetic acid. The precipitated 2,5-bis - (methyl - ethylenimino) - hydroquinone is washed with water and alcohol, and dried. It is identical with the product obtained according to Example 1.

Example 3

To a suspension of 880 milligrams of 2,5-bis-(methyl-ethylenimino)-para-quinone in a small quantity of water are added 24 cc. of 1n-caustic soda solution simultaneously with the quantity of a solution of 8.4 grams of sodium dithionite in 30 cc. of water necessary to produce a clear solution. The reaction mass is immediately neutralized with about 9 cc. of 2n-acetic acid and the resulting precipitate filtered off with suction after a short while, then washed and dried. It consists of 2,5-bis-(methyl-ethylenimino)-hydroquinone and is identical with the substance obtained according to Example 1 or 2.

Example 4

220 milligrams of 2,5-bis-(methyl-ethylenimino)-hydroquinone obtained according to Example 1, 2 or 3 are dissolved in 20 cc. of 0.1n-caustic soda solution with the exclusion of atmospheric oxygen and sealed immediately in an evacuated glass ampoule. In this way there is obtained an aqueous solution of the disodium salt of 2,5-bis-(methyl-ethylenimino)-hydroquinone.

What is claimed is:

1. A compound of the group consisting of 2,5-bis-(methyl-ethylenimino)-hydroquinone and the alkali metal salts thereof.

2. A process which comprises reacting para-quinone with C-methyl-ethylenimine in a molecular ratio of from about 1:2.5 to about 1:4 at a temperature of from about 40° C. to about 100° C., and isolating the resulting 2,5-bis-(methyl-ethylenimino)-hydroquinone.

3. A process according to claim 2 wherein the reaction is carried out under anaerobic conditions.

4. 2,5-bis-(methyl-ethylenimino)-hydroquinone.

5. The sodium salt of the compound of claim 4.

References Cited in the file of this patent

UNITED STATES PATENTS 2,770,617    Marxer _____ Nov. 13, 1956

FOREIGN PATENTS 1,118,425    France _____ Mar. 19, 1956

OTHER REFERENCES

Domagk et al.: Chem. Abstracts, vol. 48, col. 11658 (1954).

Pratesi: Chem. Abst., vol. 31, cols. 1024–5 (1937).

Bu Lock et al.: J. Chem. Soc., vol. 1951, pp. 703–12.